US009616474B2

(12) United States Patent
Schilling et al.

(10) Patent No.: US 9,616,474 B2
(45) Date of Patent: Apr. 11, 2017

(54) DEVICE AND METHOD FOR LATERALLY GUIDING A ROLLED OR CAST PRODUCT ON A TRANSPORT TRACK

(71) Applicant: SMS Group GmbH, Duessledorf (DE)

(72) Inventors: Moritz Schilling, Kreuztal (DE); Matthias Kipping, Herdorf (DE); Volker Kunze, Siegen (DE); Juergen Seidel, Kreuztal (DE)

(73) Assignee: SMS GROUP GMBH, Duesseldorf (DE)

( * ) Notice: Subject to any disclaimer, the term of this patent is extended or adjusted under 35 U.S.C. 154(b) by 0 days.

(21) Appl. No.: 14/655,829

(22) PCT Filed: Dec. 20, 2013

(86) PCT No.: PCT/EP2013/077679
§ 371 (c)(1),
(2) Date: Jun. 26, 2015

(87) PCT Pub. No.: WO2014/102189
PCT Pub. Date: Jul. 3, 2014

(65) Prior Publication Data
US 2015/0328669 A1 Nov. 19, 2015

(30) Foreign Application Priority Data
Dec. 28, 2012 (DE) .......................... 10 2012 224 505

(51) Int. Cl.
*B21B 39/14* (2006.01)
*B21B 13/06* (2006.01)
(Continued)

(52) U.S. Cl.
CPC .............. *B21B 13/06* (2013.01); *B21B 37/22* (2013.01); *B21B 37/68* (2013.01); *B21B 39/14* (2013.01);
(Continued)

(58) Field of Classification Search
CPC ....... B21B 39/14; B21B 39/16; B21B 39/165; B21C 47/3408; B21C 47/3416
See application file for complete search history.

(56) References Cited

U.S. PATENT DOCUMENTS 5,284,284 A 2/1994 Narishima et al.
5,634,360 A 6/1997 Tazoe et al.
(Continued)

FOREIGN PATENT DOCUMENTS

DE 1045954 12/1958
JP 61-222626 10/1986
(Continued)

*Primary Examiner* — Debra Sullivan
(74) *Attorney, Agent, or Firm* — Abelman, Frayne & Schwab (57) ABSTRACT

The invention relates to a device (1) and a method for laterally guiding a slab (2) on a transport track (3), comprising a first guide rule (4) and a second guide rule (5). The guide rules (4, 5) are arranged opposite each other on both sides of the transport track (3) and are each connected to at least one actuating drive (6) so as to move in a direction of a width of the transport track (3). The actuating drive can be actuated perpendicularly to the transport direction (7) of the slab (2), wherein the respective longitudinal axis ($4_L$, $5_L$) of the first guide rule (4) and/or the second guide rule (5) can be positioned at a specified angle ($\alpha$) relative to the transport direction (7) of the slab (2). The first and/or the second guide rule (4, 5) has at least one contact roller (8) which can be brought into contact with a lateral edge of the slab (2) in order to guide and/or compress the slab (2).

27 Claims, 8 Drawing Sheets

(51) Int. Cl.
    *B65G 13/04*     (2006.01)
    *B21B 37/22*     (2006.01)
    *B21B 37/68*     (2006.01)
    *B21C 47/34*     (2006.01)

(52) U.S. Cl.
    CPC .......... *B65G 13/04* (2013.01); *B21B 2203/04* (2013.01); *B21C 47/3416* (2013.01)

(56) References Cited

U.S. PATENT DOCUMENTS

2012/0096914 A1    4/2012    Seidel
2012/0279267 A1    11/2012    Tuschhoff

FOREIGN PATENT DOCUMENTS

| JP | 03-169419 | 7/1991 | |
|----|-----------|--------|---|
| JP | 03189010 | 8/1991 | |
| JP | 03264109 A * | 11/1991 | ............. B21C 47/34 |
| JP | 105842 | 1/1998 | |
| WO | 02/30587 | 4/2002 | |
| WO | 2010/149192 | 12/2010 | |

\* cited by examiner

DEVICE AND METHOD FOR LATERALLY GUIDING A ROLLED OR CAST PRODUCT ON A TRANSPORT TRACK

RELATED APPLICATIONS

This application is a National Stage application of PCT application PCT/EP2013/077679 filed Dec. 20, 2013 and claiming priority of German application DE 10 2012 224 505.7 filed Dec. 28, 2012.

BACKGROUND OF THE INVENTION

1. Field of the Invention

The invention relates to a device for laterally guiding a rolled or cast product in the form of a metal strip, a slab, or the like on a transport track, and to a corresponding method.

2. Description of the Prior Art

Lateral guide tracks for rolled or cast products in the form of a metal strip, a slab or the like are known from the prior art, in which the metal strip or the slab is guided laterally on a transport track or rolling track and can be aligned relative to a width of the transport track. Lateral guide tracks of this type can have roller guides or parallel guides with mutually opposing guide rules; however, this design can be associated with disadvantages.

WO 2010/149192 A1 discloses a method and a device for processing a slab, wherein the associated lateral guide track consists of a plurality of pairs of guide rollers arranged opposite one another. The individual rollers can be moved in the direction of the slab by means of actuators. This allows the slab to be centered at different locations along the transport track or rolling track. The respective pairs of guide rollers are spaced relatively widely from one another and are particularly arranged on different sides of processing devices.

Pairs of guide rollers, which are known, for example, from WO 2010/149192 A1 and also from JP 61222626 A, have the disadvantage that a defined torque cannot be exerted on the slab if only one pair of guide rollers is in contact with the slab or with the slab head. As a result, the slab can be displaced between the pair of guide rollers in the direction of a width of the rolling track, but cannot be rotated in a defined manner.

Torque can be applied to the slab only when a subsequent pair of guide rollers comes into contact with the slab downstream. If the pairs of guide rollers are spaced relatively widely from one another, the slab disadvantageously still cannot be rotated on the rolling track in a targeted manner as it is being transported between these two pairs of guide rollers. In other words, torque can be applied to the slab only in a delayed fashion, specifically once the slab head has come into contact with an additional pair of guide rollers. A further disadvantage of such a series connection of pairs of guide rollers is that the slab head can move laterally between the pairs of guide rollers, since the slab is not guided laterally in this region.

As an alternative to a roller guide, it is also known to align a slab on a rolling track using a guide rule, as is disclosed, e.g., in DE 43 10 547 C2, in DE 41 29 988 C2 or WO 2011/080174 A2. Guiding the slab laterally between such guide rules, which are moved up to the lateral edges of the slab, is disadvantageous because the forces between the guide rules and the slab may potentially cause a high level of friction, which can lead to a discontinuous transport or to the slab becoming "stuck". If the slab is driven solely by rolling track rollers and is not subjected to any additional tensile forces, e.g. from a drive or a roller stand, only small levels of friction relative to the slab are permissible during the "lateral guidance" process, to prevent the slab from becoming stuck.

A further disadvantage of conventional guide rules is that they are generally very long in design, which has a negative effect on the lengths of the systems. In this context it is likewise disadvantageous that the guide rules as disclosed, e.g. in DE 43 10 547 C2 form an infeed chute, however said chute cannot be used as a guiding length after the slab head has passed the guiding chute and the infeed chute is no longer necessary.

The object of the present invention is to optimize a device and a method for laterally guiding a rolled or cast product on a transport track such that the rolled or cast product can be centered on the transport track and selectively aligned quickly and over a short section of the transport track by the application of torque, in order to prevent the rolled or cast product from colliding with components downstream of it in the transport direction and/or to ensure the centered transport of the product on the transport track.

SUMMARY OF THE INVENTION

A device according to the invention comprises a first and a second guide rule, wherein said guide rules are arranged opposite one another on both sides of the transport track and are each connected to at least one actuating drive so as to move in the direction of a width of the transport track, and wherein said actuating drives are actuable perpendicularly to the transport direction of the rolled or cast product. The longitudinal axis of the first guide rule and/or of the second guide rule can be positioned and/or arranged at a specified angle relative to the transport direction of the cast product. Additionally or alternatively, the first guide rule and/or the second guide rule can be arranged at different distances from the center of the transport track in relation to one another. The first guide rule and/or the second guide rule further have at least one contact roller which can be placed in contact with a lateral edge of the cast product as the guide rule is moving in the direction of the rolled or cast product, specifically for the purpose of guiding the rolled or cast product and/or reducing the width thereof by compression.

A method according to the invention is carried out using a lateral guide device which corresponds to the above device, and which comprises a first guide rule and a second guide rule, wherein the guide rules are arranged opposite one another on both sides of the transport track, and are each connected to at least one actuating drive so as to move in the direction of a width of the transport track, said actuating drive being actuable perpendicularly to the transport direction of the cast product. To detect an actual position of the cast product on the transport track, at least one sensor device can optionally be provided. Depending on the actual position of the cast product on the transport track, the first guide rule and the second guide rule are displaced by means of the actuating drives such that the longitudinal axis of each is positioned independently of the other at a specified angle relative to the transport direction of the rolled or cast product. Additionally or alternatively, the guide rules can be arranged at different distances from the center of the transport track.

The invention is similarly suitable for both cast products and rolled products. Therefore, the term "product" will be used in the following for both.

The invention is based on the essential understanding that a predefined slant angle of the longitudinal axis of each of the guide rules relative to the transport direction of the product can be set, particularly on the basis of a respective actual position of the product on the transport track. As a result, a variable configuration of the guide rules relative to one another and/or relative to the product is possible. Together, the guide rules can form, e.g. a guide chute for infeed of the cast product, or a parallel guide once the leading end face of the cast product has passed the infeed-side ends of the guide rules.

Additionally or alternatively, it is possible for the guide rules to be positioned by actuating the actuating drives, such that the distances of the guide rules from the center of the transport track are different from one another. It is thereby possible for the product to pass through the region of the guide rules on the transport track asymmetrically to the center of the transport track.

The angle of slant of the guide rules can expediently also be adjusted as the product is being transported along the transport track, i.e. as the product is moving past the guide rules. A transverse force and/or a torque can thereby be applied to the product. A lateral guide track is also provided thereby, which forms an infeed chute and can act as a parallel guide or as a simple lateral roller guide within the same installation space which has compact dimensions.

The contact roller on the guide rule can be used to compress the product, i.e. to reduce its width. Accordingly, the contact roller and the actuating drive of the associated guide rule assigned thereto are designed such that sufficiently strong forces are exerted on a lateral side or edge of the product in order to achieve the desired width reduction. Expediently, mutually opposing contact rollers are provided on the respective guide rules for this purpose. This leads to a uniform and controlled reduction in the width of the product, wherein the actuating forces of the associated actuating drives preferably extend in opposite directions, and if they are equal, they are mutually canceled out.

The adjustment of a specified angle of slant for a corresponding guide rule can be carried out in a simple manner in that each guide rule is connected by an articulated connection to two adjustment drives, wherein these articulated connections can be provided at the infeed-side ends and the outlet-side ends of the guide rules. Since the two actuating drives for each guide rule are actuated independently of one another perpendicularly to the transport direction of the product, a specified angle of a longitudinal axis of the corresponding guide rule relative to the transport direction of the product can be set. Alternatively, it is possible to provide only one actuating drive for each guide rule, with said drive being connected to the guide rule, e.g. at the center region thereof, by an articulated connection, wherein said articulated connection is equipped with a servo motor or the like for a rotational movement of the guide rule. Alternatively, two actuating drives may be provided for each guide rule, preferably at the infeed-side end and at the outlet-side end of a respective guide rule. By actuating the servo motor or the two actuating drives, the longitudinal axis of a guide rule, as described, can be positioned at a specified angle relative to the transport direction of the product and/or can be arranged at a specified distance from the center of the transport track.

Mounting contact rollers on the guide rules has the advantage of further reducing the friction between the product and the guide rules. In an advantageous development of the invention, the contact rollers can be driven separately, e.g. by means of a hydraulic, pneumatic or electromechanical drive. This serves to ensure that the product will not become "stuck" between the guide rules when the guide rules apply a lateral force to the lateral edges of the product.

The low-friction guidance of the product between the guide rules can further be improved by mounting the contact rollers on the guide rules at both the infeed-side end and the outlet-side end. Optionally, a contact roller can also be arranged on the guide rule at the center region thereof. Since the contact rollers are connected to one another by the guide rule, the leading end face of the product cannot pass laterally between the contact rollers.

Connecting the contact rollers by means of the guide rule has the further advantage that the risk of a faulty control of the contact rollers that are mounted at the respective outlet-side ends of the guide rules is diminished or excluded by virtue of the mechanical coupling via the guide rule to the contact rollers that are mounted at the respective infeed-side ends of the guide rules. This means that a leading edge can pass between the contact rollers, wherein contact with the guide rule that is positioned therebetween prevents the product from becoming jammed or stuck.

Combining a roller guide with a linear guide allows the total length of the guide rules to be designed as relatively short. The length of the guide rules in the transport direction of the product can be less than 10 m, preferably less than 6 m, and further preferably less than 4 m.

Such a relatively short length of the guide rules has an advantageous effect on compact overall dimensions of a transport track and/or processing track for products.

The invention not only allows the product to be centered at points along the transport track, but also allows it to be guided in the center of the transport track by applying torque. In this manner, the product can be guided without limitation on the transport track in a specified position. As a result, additional components and/or processing stations arranged downstream of the guide rules in the transport direction can be suitably protected against collisions with the product.

BRIEF DESCRIPTION OF THE DRAWINGS

In the following, embodiment examples of the invention will be specified in greater detail in reference to schematically simplified drawings.

The drawings show.

DETAILED DESCRIPTION OF THE PREFERRED EMBODIMENTS

Figure 1:
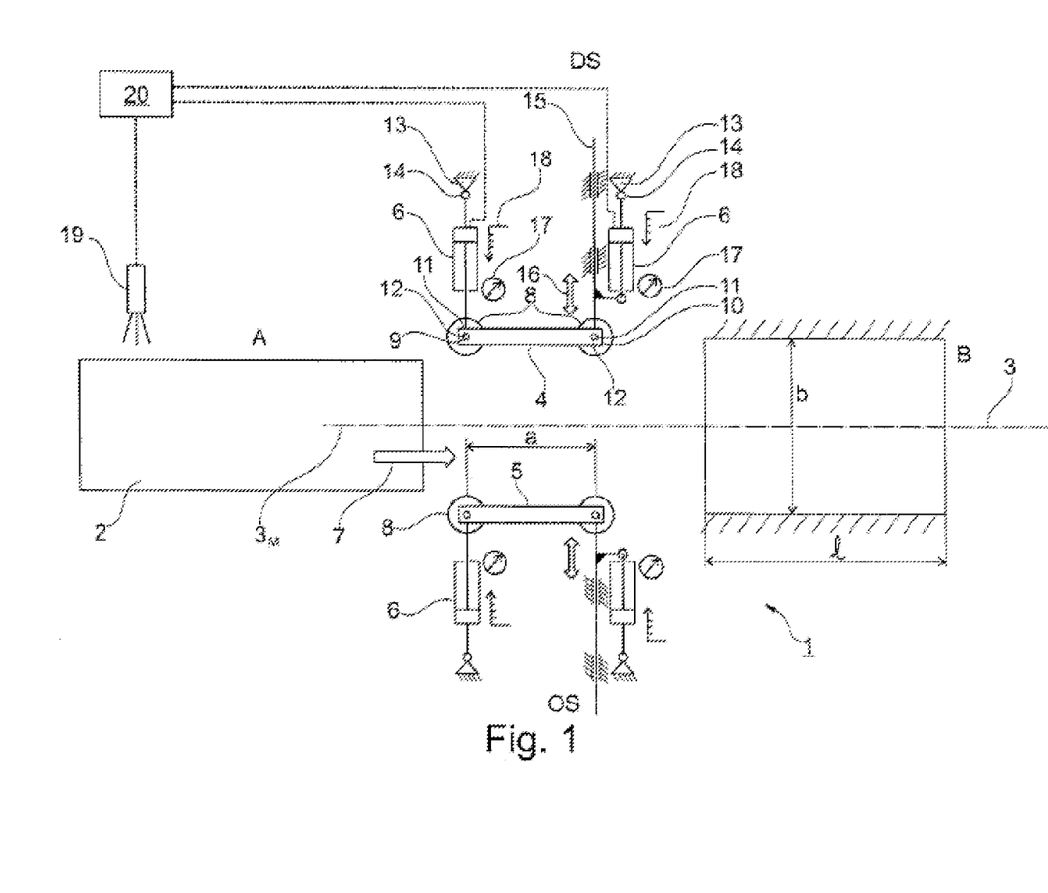
FIG. 1 a schematic plan view of a device according to the invention for laterally guiding a product, FIG. 2 a schematic plan view of another embodiment of a device according to the invention, FIGS. 3-7 schematic illustrations of various operating states of the device according to FIG. 1 for laterally guiding a product on a transport track, and FIGS. 8-10 schematically simplified plan views of a product resting in different positions on a transport track.

FIG. 1 shows a schematically simplified plan view of a device according to the invention, with which a cast product 2 can be guided laterally on or along a transport track 3. Transport track 3 is indicated in FIG. 1 in simplified form by a dotted-dashed line, wherein transport track 3 can be a component (roller conveyor) of a rolling track. A symmetrical center of said transport track 3 is hereinafter referred to as the transport track center and is identified in FIG. 1 as "$3_M$". Cast product 2 can be a metal strip, a slab or some other rolled product. Without being limited thereto, cast product 2 will be hereinafter referred to as a slab.

Device 1 comprises a first guide rule 4 and a second guide rule 5. The guide rules 4, 5 are arranged on both sides of transport track 3 and opposite one another. In FIG. 1, a drive side and an operating side of transport track 3 are identified as "DS" and "OS", respectively. Furthermore, an infeed side relative to the guide rules 4, 5 is identified as "A" and an outlet side is identified as "B". This means that slab 2 is transported from side A between the guide rules 4, 5, and exits the guide rules 4, 5 in the direction of outlet side B. In the region of outlet side B, additional processing stations and/or follow-on components of transport track 3 can be provided, with the width of said follow-on components being indicated as "b", and a length thereof indicated as "l".

Each of the guide rules 4, 5 is connected to actuating drives 6, which ensure a movement of the guide rules 4, 5 in the direction of a width of transport track 3. The configuration of these actuating drives 6 and the connection thereof to a corresponding guide rule 4, 5 can be the same on both sides of transport track 3. In other words, device 1 can be designed symmetrically to transport track center $3_M$. Accordingly, only the configuration of the actuating drives 6 on drive side DS will be described in the following, with said description applying likewise to operating side OS.

For the first guide rule 4 arranged on drive side DS, two actuating drives 6 are provided, which can be actuated independently of one another. The actuating drives 6 can be hydraulic cylinders, for example. Actuating the two actuating drives 6 differently allows a specified angle α (cf. FIG. 3) to be set, which is formed by a longitudinal axis $4_L$ of guide rule 4 and transport direction 7. In other words, an angle of slant of guide rule 4 relative to transport direction 7 can be adjusted by actuating the two actuating drives 6 differently.

On the first guide rule 4, contact rollers 8 are mounted, specifically at the infeed-side end 9 and the outlet-side end 10 thereof. Each of the two adjustment drives 6 is connected to the first guide rule 4 via an articulated connection 11. Actuating drives 6 are arranged in such a way that the articulated connections 11 thereof to guide rule 4 are spaced from one another by a distance a. In this manner, articulated connections 11, with which the respective actuating rods of actuating drives 6 are articulated to the first guide rule 4, are arranged coaxially to a respective axis 12 of an associated contact roller 8. Articulated connection 11 and axis 12 can thereby be combined to form a functional unit, for example. In any case, the rotational axes of articulated connection 11 and axis 12 in the embodiment described herein coincide.

Actuating drives 6 are connected to frame 13 by an articulated connection, on the sides of the drives that are opposite the first guide rule 4, specifically in each case via a pivot bearing 14, which forms a pivotable bearing for the respective actuating drive 6.

In light of articulated connections 11, via which actuating drives 6 are connected to the first guide rule 4, and in light of the stated pivot bearing 14 on the opposite side of actuating drives 6, it is critical to a certain positioning of guide rule 4 for the actuation of at least one of actuating drives 6, either at infeed-side end 9 or at outlet-side end 10, to be converted to a movement perpendicularly to transport direction 7. In the embodiment of FIG. 1, this is ensured by a sliding guide 15, which is displaceable in a perpendicular direction 16 relative to transport direction 7 of slab 2. Actuating drive 6, which acts at outlet-side end 10 of guide rule 4, is operatively connected to this one sliding guide 15, specifically in that a piston rod of said actuating drive is suitably attached to sliding guide 15.

Sliding guide 15 can be designed in the simplest manner as a rod element having a round or angular cross-section, which is guided axially in a motion link that is matched thereto. Alternatively, a guide for a roller, mounted in a built-in element that is moved in a frame, is also possible. The interaction of actuating drive 6 with the sliding guide located at outlet-side end 10 of the first guide rule 4 can be produced in that the actuating rod of said actuating drive 6 is connected to the rod element of sliding guide 15, e.g. by welding or by screw attachment. Accordingly, an actuation of this actuating drive 6 leads to an axial displacement of sliding guide 15 in sliding direction 16, i.e. toward or away from the center of transport track 3, and therefore to a movement of contact roller 8, which is mounted at outlet-side end 10 of the first guide rule 4, perpendicularly to transport direction 7.

Alternatively to the described sliding guide 15, it is also possible to fix or to secure actuating drive 6 in a specific direction, e.g. at outlet-side end 10 of guide rule 4, without a pivot bearing on frame 13, wherein a longitudinal direction of said actuating drive 6 is preferably aligned perpendicular to transport direction 7 of slab 2. In this case, as described above, an actuating rod of said actuating drive 6 is connected in an articulated fashion to outlet-side end 10 of guide rule 4 via articulated connection 11. For the present invention, said fixed attachment of an actuating drive 6 on frame 13 is likewise to be understood in the manner of a sliding guide, which ensures a movement of an associated articulated connection to the guide rule perpendicularly to the transport direction.

If the actuating drives 6 at infeed-side end 9 and at outlet-side end 10 of the first guide rule 4 are actuated differently from one another, the resulting angled position of actuating drive 6, which in the embodiment of FIG. 1 is connected to infeed-side end 9 of guide rule 4, can be compensated for by articulated connection 11 and by pivot bearing 14.

The actuation of the two actuating drives 6 can be force-controlled and/or path-controlled. For this purpose, a pressure transducer 17 and a path transducer 18 are provided for each actuating drive 6.

The position and form of slab 2 on transport track 3 can be detected by at least one measuring device or sensor device 19, which is connected in terms of signal transmission to a control device 20 (indicated in FIG. 1 in a symbolically simple fashion by a dashed line). Such a measuring device can preferably be designed as a distance meter or the like, e.g. in the form of a laser distance meter. The position of measuring device 19, as shown in FIG. 1, is intended merely as an example. Alternatively, measuring device 19 can also be arranged centered between the two guide rules 4, 5 or also downstream of the guide rules 4, 5 in the region of outlet side B. It is also possible to provide a plurality of measuring devices 19 at various locations along transport track 3, with each device being connected to control device 20. With respect to the at least one measuring device 19, it is understood that this is an optional feature for device 1.

Actuating drives 6 are suitably actuated by control device 20, specifically on the basis of the slab width and/or the signals from pressure transducer 17 and/or path transducer 18. For this purpose, actuating drives 6 are connected in terms of signal transmission to control device 20, which is indicated symbolically in FIG. 1 by dashed lines. If a sensor device 19 is also provided for the embodiment of FIG. 1, the actuating drives can also be actuated on the basis of the actual position and form of slab 2 on transport track 3, detected by sensor device 19. In this connection, it can be stated that, in the context of the present invention, the actual position and form of slab 2 is understood in relation to a width of transport track 3 and in relation to a position along transport track 3, i.e. along transport direction 7. As a result, actuating drives 6 are actuated for moving the guide rules 4, 5 on the basis of the detected actual position and actual form of slab 2, in order to adjust a desired target position of slab 2 on transport track 3. With adequate dimensions of the actuating drives, a transverse force applied to the slab can be great enough that the contact with the guide rules 4, 5 or with contact rollers 8 mounted thereon compresses slab 2, thereby reducing its width.

Figure 2:
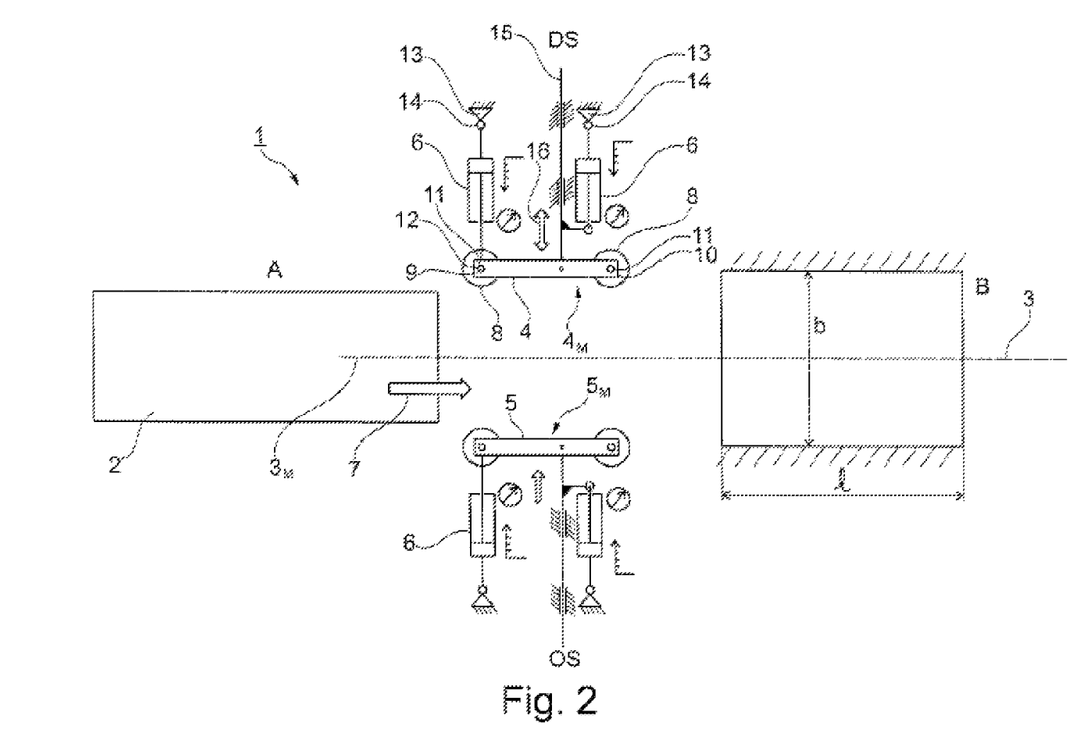

FIG. 2 shows an additional embodiment of device 1 according to the invention. The design of this embodiment is similar to the embodiment of FIG. 1, with corresponding components being identified by the same reference signs. In the interest of simplicity, in the illustration of FIG. 2, sensor device 19 and control device 20 are not shown, although these components can likewise be provided in the embodiment according to FIG. 2.

The embodiment of FIG. 2 differs from the embodiment of FIG. 1 in that sliding guide 15 on the first guide rule 4 is not articulated to outlet-side end 10 thereof, and is instead pushed—in the view of FIG. 2 toward the left—in the direction of infeed-side end 9. Accordingly, articulated connection 11 between sliding guide 15 and the first guide rule 4 is then arranged in an approximately centered region $4_M$ of the first guide rule 4, rather than coaxially to axis 12 of contact roller 8 at outlet-side end 10 of the first guide rule 4. Such an arrangement of sliding guide 15 in connection with actuating drive 6 has the advantage over the embodiment of FIG. 1 of a more compact design.

Similarly, for the embodiment of FIG. 2, the functioning mechanism by which guide rule 4 can be pivoted by a varying actuation of actuating drive 6 remains unchanged from the embodiment of FIG. 1, and therefore, in the interest of avoiding repetition, reference is made to the statements relating to FIG. 1.

An additional (not shown) embodiment of the articulated connection of the actuating drives to the guide rule can be provided by exchanging the two actuating drives 6 of FIG. 1. In this case, sliding guide 15 is connected in an articulated fashion to the actuating drive 6 associated with it, at infeed-side end 9 of guide rule 4, and the other actuating drive is articulated to outlet-side end 10 of guide rule 4 and is connected via a pivot bearing 14 to frame 13.

In the following, various possible operating states of device 1 for carrying out the method according to the invention will be discussed in detail.

As discussed above in reference to FIG. 1, the four actuating drives 6 for the two guide rules 4, 5 can be actuated independently of one another. Accordingly, the guide rules 4, 5 can be moved in the direction of the width of transport track 3, and the longitudinal axes $4_L$, $5_L$ thereof can be adjusted to a specified angle relative to transport direction 7. In this manner, the guide rules 4, 5 can be used to form a chute for "capturing" slab 2 and to generate a torque, which is exerted on slab 2 for a rotation thereof at points along transport track 3. This process will now be described in detail in reference to FIGS. 3-7 for various operating states of the guide rules 4, 5.

Figure 3:
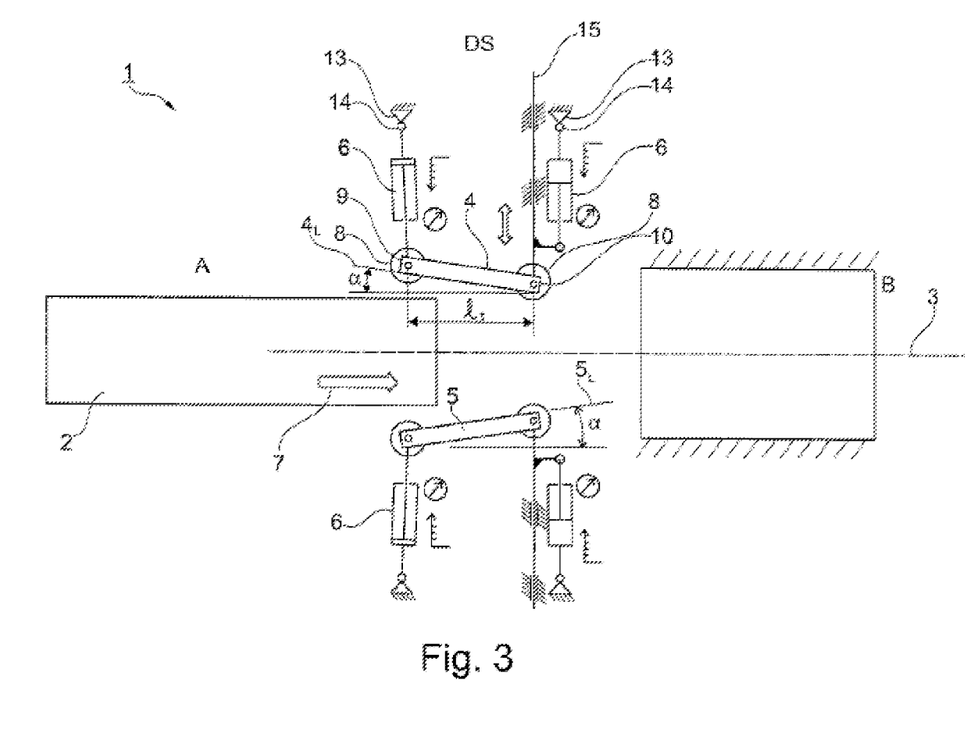

FIG. 3 shows a schematically simplified plan view of device 1 according to the embodiment of FIG. 1. In the operating state shown in FIG. 3, the infeed-side ends 9 of the guide rules 4, 5 in relation to one another are spaced farther from one another than the outlet-side ends 10. As a result, the longitudinal axes $4_L$, $5_L$ of the guide rules 4, 5 are positioned at the angle α relative to transport direction 7. The guide rules 4, 5 thereby form a so-called infeed chute, which has a chute length $l_r$. In the operating position of FIG. 3, for example, the head of slab 2 can be captured and centered. The adjusted angular position of the longitudinal axes $4_L$, $5_L$ of the guide rules 4, 5 relative to transport direction 7 is expediently selected on the basis of a respective width of slab 2 and the actual position thereof on transport track 3.

Figure 4:
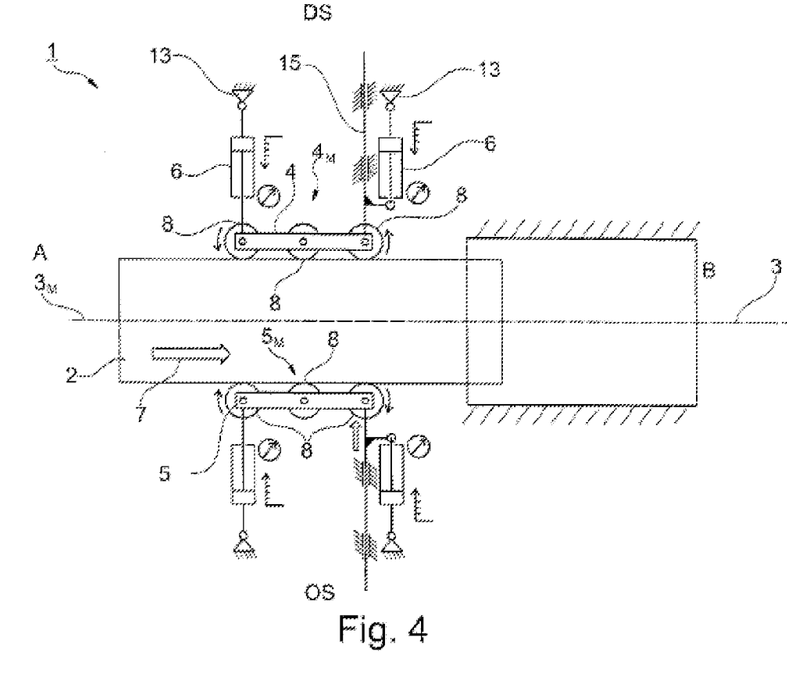

The operating position according to FIG. 3 with the described infeed chute is preferably selected for an infeed of slab 2, i.e. when a leading end face of slab 2 is traveling past contact rollers 8 at infeed-side ends 10 of the guide rules 4, 5. FIG. 4 shows a further possible operating state which can be established for the guide rules 4, 5 once the leading end face of slab 2 has also passed the contact rollers 8 at the outlet-side end of the guide rules 4, 5. Actuating drives 6 are then actuated so as to position the guide rules 4, 5 in parallel, specifically relative to one another and relative to transport direction 7. The guide rules 4, 5 are moved far enough in the direction of a transport track center $3_M$ that contact rollers 8 come into contact with a lateral edge of slab 2. To this extent, slab 2 can roll along contact rollers 8 as it moves in transport direction 7. In FIG. 4, the directions of rotation of each of contact rollers 8 are indicated by curved arrows.

Alternatively, the guide rules 4, 5 can be adjusted in parallel to one another, with the degree of opening, i.e. the distance between the guide rules 4, 5, being selected as greater than the width of slab 2. As a result, a gap is created between contact roller(s) 8 and the lateral edges of slab 2.

Figure 5:
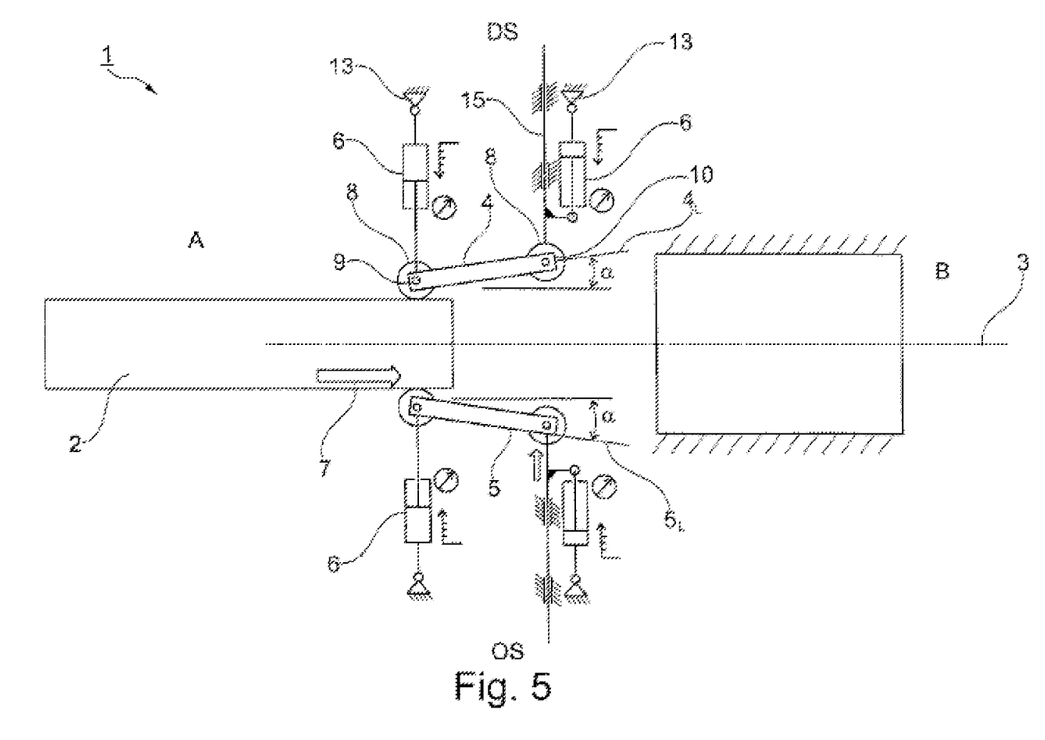
Figure 6:
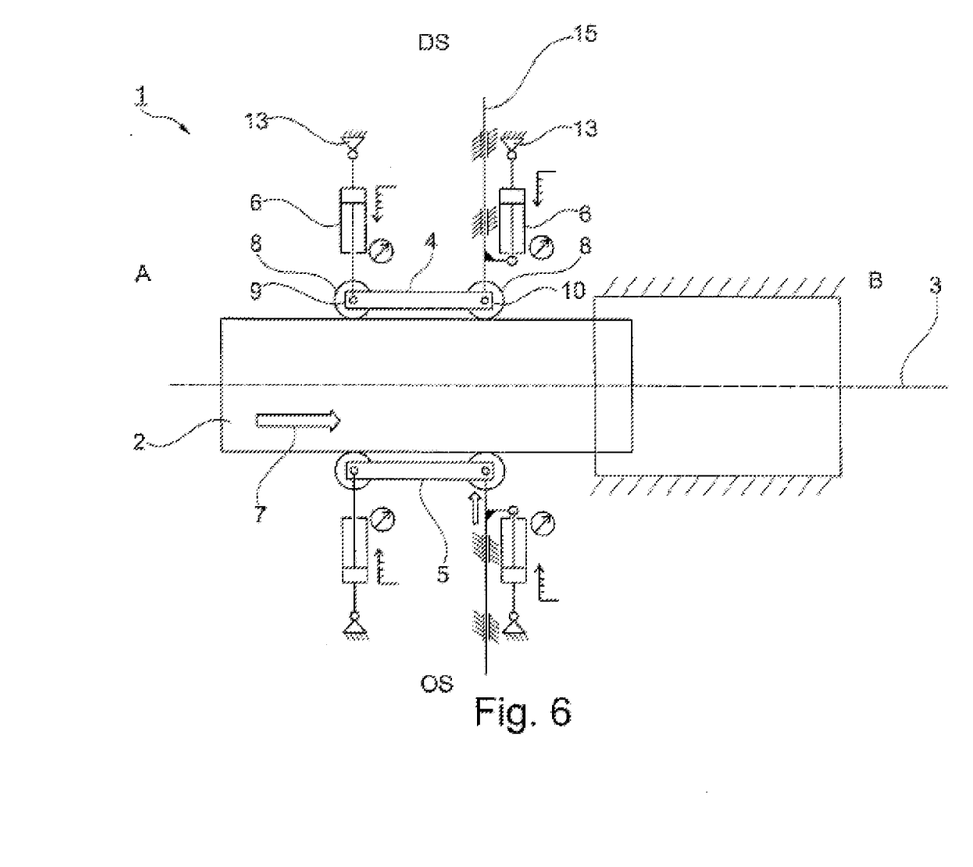

A further possible operating state for device 1 is shown in the plan view of FIG. 5. This operating state is understood as inverse to the operating state according to FIG. 3, wherein in this case, the longitudinal axes $4_L$, $5_L$ of the two guide rules 4, 5 are angled relative to transport direction 7 such that they form a chute that is open toward outlet region B. In this operating state, shortly after slab 2 passes contact rollers 8 at infeed-side end 9 of the guide rules 4, 5, it is grasped immediately and centered relative to a width of transport track 3. Contact rollers 8 at outlet-side end 10 of the guide rules 4, 5 can then be placed in contact with the lateral edges of the slab, as illustrated by the plan view of FIG. 6, once the leading end face of slab 2 has also passed said pair of contact rollers.

Figure 7:
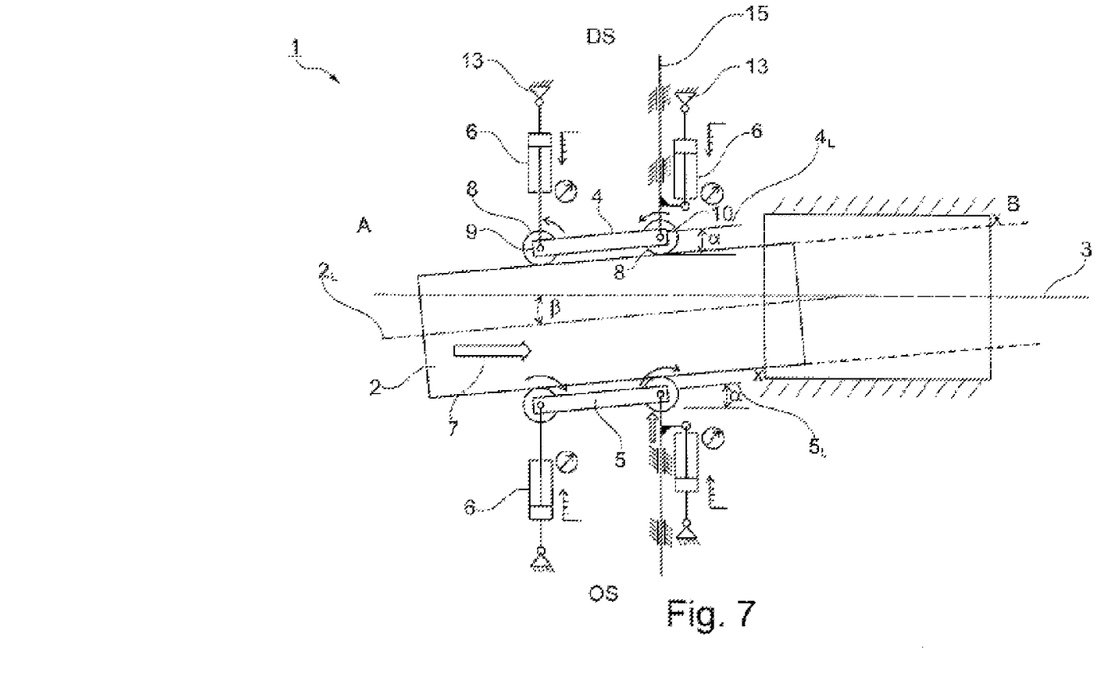

Finally, a further possible operating state for device 1 is shown in the plan view of FIG. 7. In this case, guide rules 4, 5 are adjusted parallel to one another and with their respective longitudinal axes $4_L$, $5_L$ at the same angle α relative to transport direction 7. A specified torque can be exerted on slab 2 by displacing the pairs of contact rollers at infeed-side end 9 or at outlet-side end 10 of guide rules 4, 5, transversely to transport direction 7. This enables slab 2 to be rotated as it moves along the belt or as slab 2 is being transported along transport track 3, while all of contact rollers 8 remain in constant contact with the lateral edges of slab 2. Once again, the directions of rotation of contact rollers 8 are each indicated by curved arrows in FIG. 7. With respect to slab 2, a specified direction and a specified centered position of the leading edge of the slab can thereby be set, so that a centered passage at the center of a follow-on component on the transport track downstream of device 1 is ensured. Sufficient lateral distance of slab 2 from a follow-on component downstream of device 1 is indicated in FIG. 7 in simplified form by the distances indicated on both sides of slab 2 as "x". An angled position of slab 2 on transport track 3 is indicated by an angle β, which is formed between a longitudinal axis $2_L$ of slab 2 and transport direction 7.

In reference to the illustration of FIG. 7, it is noted that, according to one operating state of the invention (not shown), it is also possible for guide rules 4, 5 in conjunction with contact rollers 8 mounted thereon to be displaced by different distances in relation to one another on drive side "DS" and on operating side "OS" relative to transport track center $3_M$. This means that the guide rules are each at a different distance from transport track center $3_M$. As a result, slab 2 then passes asymmetrically through the region of the guide rules.

In all the operating states according to FIGS. 3-7, once a leading end face or the leading edge of slab 2 has also passed contact rollers 8 at outlet-side end 10 of guide rules 4, 5, guide rules 4, 5 are moved in the direction of transport track center $3_M$ so that all of contact rollers 8 come into rolling contact with the lateral edges of slab 2. If a driving force of rolling track rollers (not shown) is not sufficient to transport slab 2, the contact rollers 8 mounted on guide rules 4, 5 can be driven separately to exert an additional driving force on slab 2, and thereby prevent slab 2 from becoming "stuck" on transport track 3.

Figure 8:
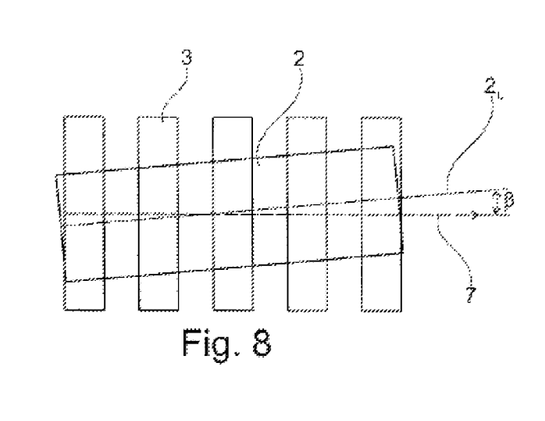
Figure 9:
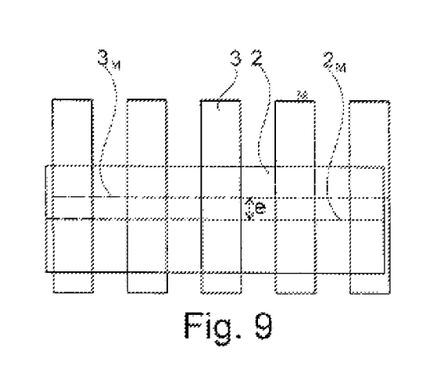
Figure 10:
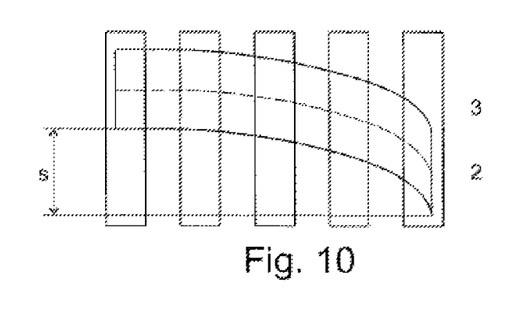

With all of the above-stated embodiments of the invention, it is understood that different forms and/or positions of slab 2 can thereby be suitably guided by guide rules 4, 5. FIGS. 8-10 show various positions and/or forms with respect to a slab 2, specifically in an angled position on transport track 3, in which a longitudinal axis $2_L$ of slab 2 forms an angle β with transport direction 7 (FIG. 8), in a position having an eccentricity e by which a center axis $2_M$ of slab 2 is spaced from a transport track center $3_M$ (FIG. 9), and in the form of a so-called strip camber (FIG. 10), in which a leading end of slab 2 has a chord height s relative to a base surface of slab 2.

Guide rules 4, 5 are not only suitably adjusted for the end face or the slab head of slab 2, but can also be positioned differently over the entire slab length, depending on the form and position of the slab.

The diagram of FIG. 4 shows, by way of example, a further possible embodiment, according to which an additional contact roller 8 is attached, mounted on the two guide rules 4, 5 at the center regions $4_M$, $5_M$ of each. Thus a total of three contact rollers 8 is provided on each of the two guide rules 4, 5. The center contact rollers 8 improve the guiding characteristics of the guide rules 4, 5 and prevent slab 2 from becoming jammed if the slab head should strike a center region of the guide rules 4, 5 at an angle. In addition, center contact rollers 8 improve a reduction in the width of slab 2, i.e. said reduction is carried out more uniformly when the guide rules are engaged with a corresponding amount of force against slab 2.

With all of the embodiments illustrated in the set of drawings, it is understood that at least three contact rollers 8 can be provided on at least one guide rule 4, 5, according to the diagram of FIG. 4. It is further alternatively possible for two contact rollers 8 to be mounted on at least one guide rule 4, 5, specifically at the center region $4_M$, $5_M$ (cf. FIG. 4) and at the infeed-side end 9 thereof.

Based on the signals from pressure transducer 17, actuating drives 6 can be actuated in a force-controlled manner when the guide rules 4, 5 are engaged against slab 2, and when contact rollers 8 come into contact with the lateral edges of slab 2, such that a force with which contact rollers 8 are pressed against the lateral edges of slab 2 does not exceed a predefined threshold value. Damage to slab 2 is thereby effectively prevented. Such an actuation of actuating drives 6 is carried out when a compression or a width reduction of slab 2 is not desired.

Based on the signals from path transducer 18, a conclusion can be drawn by control device 20 as to the respective positions of the two guide rules 4, 5 and/or the contact rollers attached thereto in relation to transport track center $3_M$. Predefined threshold values for the distances or positions which contact rollers 8 must maintain in relation to a lateral edge of transport track 3 are stored in control device 20. If control device 20 detects a failure to maintain these defined threshold values—in other words, if the contact rollers 8 of a guide rule are positioned too close to an edge region of transport track 3—a suitable actuation of actuating drives 6 will move the associated guide rule back in the direction of transport track center $3_M$, in order to guide slab 2 back into an optimal path and/or in a specified direction so as to ensure a collision-free centered positioning of slab 2 on transport track 3, downstream of device 1. A path control of this type serves to ensure that slab 2 is guided along a trajectory, the temporal and geometric form of which are designed to ensure that follow-on components arranged downstream of device 1 on transport track 3 will not be contacted and/or damaged.

If device 1 is equipped with a measuring or sensor device 19 as shown in FIG. 1, which particularly monitors infeed region A upstream of device 1, a position of slab 2 and the form thereof on transport track 3 can be detected early, before slab 2 reaches guide rules 4, 5. Depending on the actual position and actual form of slab 2 on transport track 3 that are detected by sensor device 19, particularly in the event of an unplanned eccentricity e (cf. FIG. 9), guide rules 4, 5 can form a chute, as illustrated in FIG. 3, in order to "capture" the leading end face of slab 2. The respective angles α that are set for the two guide rules 4, 5 result from the respective actual position of slab 2 on transport track 3.

In a further development of the invention, a position of slab 2 behind device 1, i.e. downstream thereof, can also be determined. This can be achieved by constantly monitoring the position of the force-controlled guide rules 4, 5 and/or contact rollers 8 that are mounted thereon, in order to ascertain the further transport of slab 2 downstream of device 1. From the values measured at various times, the position of slab 2 over a specified length l and width b (cf. FIG. 1) downstream of device 1 can be determined. Collisions with adjacent and follow-on structural components, e.g. a brace, an inductive heater or the like, can thereby be avoided by guiding or stopping slab 2 accordingly when a collision is imminent.

A further advantageous option for monitoring the travel path of slab 2 on transport track 3 involves using additional measuring instruments, e.g. distance meters, preferably based on laser technology, or cameras (optical and/or thermal imaging cameras), by which the edges of the slab relative to a reference plane or relative to a reference point can be detected over a length of the slab. These measuring instruments can be connected in terms of signal transmission to control device 20 in a manner similar to sensor device 19. In this manner, it is possible to determine the position of the entire slab 2 and to guide said slab by means of guide rules 4, 5 along a suitable, specified trajectory over transport track 3 between lateral boundaries without a collision.

The invention claimed is:

1. A device (1) for laterally guiding a rolled or cast product (2) in the form of a metal strip and/or a slab on a transport track (3), comprising a first guide rule (4) and a second guide rule (5), wherein the first and second guide rules (4, 5) are arranged opposite one another on both sides of the transport track (3) and are each connected for movement in a direction of a width of the transport track (3) to at least one actuating drive (6), which can be actuated perpendicularly to a transport direction (7) of the rolled or cast product (2), wherein the first guide rule (4) and/or the second guide rule (5) each can be positioned independently from one another by an actuation of the at least one respective actuating drive such that a respective longitudinal axis ($4_L$, $5_L$) of each is positioned, independently of the other, at a respective specified angle ($\alpha$) relative to the transport direction (7) of the rolled or cast product (2) and/or at a different distance from a transport track center ($3_M$), wherein the first guide rule (4) and/or the second guide rule (5) each has at least one contact roller (8), which can be placed in contact with a lateral edge of the rolled or cast product (2) by moving the corresponding guide rule (4, 5), in order to guide the rolled or cast product (2) and/or to reduce the width thereof by compression, and wherein the first guide rule (4, 5) and/or the second guide rule (4, 5) each has a further contact roller (8), and the at least one and further contact rollers (8) are each mounted at an infeed-side end (9) and at an outlet-side end (10) of the corresponding guide rule (4, 5), respectively.

2. The device (1) according to claim 1, characterized in that the at least one contact roller (8) mounted on the first and/or on the second guide rule (4, 5) can be mounted in a center region ($4_M$, $5_M$) thereof instead of being mounted at the infeed side end (9) thereof.

3. The device (1) according to claim 1, characterized in that the first guide rule (4) and/or the second guide rule (5) are each connected via an articulated connection (11) to the respective associated actuating drives (6).

4. The device (1) according to claim 3, characterized in that the respective associated actuation drive is formed as a servo motor for rotational movement of the guide rule (4, 5) and is provided in a region of the respective articulated connection (11), so that the respective longitudinal axis ($4_L$, $5_L$) of the guide rule (4, 5) can be positioned at the respective specified angle ($\alpha$) relative to the transport direction (7) of the rolled or cast product (2).

5. The device (1) according to claim 1, characterized in that, for the first guide rule (4) and/or for the second guide rule (5), a further actuating drive (6) is provided in each case, which is connected in an articulated manner (11) to the respective guide rule (4, 5), the at least one and the further actuating drives of the guide rules (4, 5) are arranged, respectively spaced from one another, and both can be actuated independently of one another, and in that an articulated connection (11) of at least one of these two actuating drives (6) is arranged coaxially with the respective guide rule (4, 5) or adjacent to an axis (12) of a respective contact roller (8) mounted on the respective guide rule (4, 5).

6. The device (1) according to claim 5, characterized in that each of the articulated connections (11) of the two actuating drives (6) is arranged coaxially with the guide rule or adjacent to the axis (12) of the contact roller (8) mounted at the infeed-side end (9) of the guide rule or the contact roller (8) mounted at the outlet-side end (10) of the guide rule (4, 5).

7. The device (1) according to claim 5, characterized in that at least one of the respective two actuating drives (6) is connected on its side that is opposite the respective guide rule (4, 5) to a frame (13) via a pivotable bearing (14), wherein the respective guide rule (4, 5) is connected in an articulated manner to a respective sliding guide (15) which can be displaced perpendicularly to the transport direction (7) of the rolled or cast product (2), such that another of the two actuating drives (6) is operatively connected to the sliding guide (15).

8. The device (1) according to claim 7, characterized in that the articulated connection (11) is provided at a center region ($4_M$, $5_M$) of the first and/or second guide rule (4, 5), or in that the articulated connection (11) of the sliding guide (15) to the guide rule (4, 5) is provided in the region of the infeed-side end or the outlet-side end (9, 10) thereof, and is arranged coaxially or adjacent to an axis (12) of a contact roller (8) mounted at a same point on the guide rule.

9. The device (1) according to claim 1, characterized in that the actuating drives (6) can be actuated in a force-controlled manner by means of a pressure transducer (17) and/or in a path-controlled manner by means of a path transducer (18).

10. The device (1) according to claim 1, characterized in that at least one sensor device (19) is provided, with which an actual position and/or an actual form of the rolled or cast product (2) on the transport track (3) can be detected, wherein the actuating drives (6) for the guide rules can be actuated by a control device (20) on the basis of the detected actual position and/or actual form of the rolled or cast product (2), in order to set a desired target position and/or a target form of the rolled or cast product (2) relative to a width of the transport track (3).

11. The device (1) according to claim 1, characterized in that the at least one and the further contact rollers (8) can be driven each with a hydraulic, pneumatic or electromechanical drive.

12. The device (1) according to claim 1, characterized in that a length of the guide rules (4, 5) in the transport direction (7) of the rolled or cast product (2) is less than 10 meters.

13. The device according to claim 12 wherein a length of the guide rules (4, 5) in the transport direction (7) of the rolled or cast product (2) is less than 6 meters.

14. The device according to claim 12 wherein a length of the guide rules (4, 5) in the transport direction (7) of the rolled or cast product (2) is less than 4 meters.

15. A method for laterally guiding a rolled or cast product (2) in the form of a metal strip, a slab on a transport track (3) having a lateral guide device (10), which comprises a first guide rule (4) and a second guide rule (5), wherein the guide rules (4, 5) are arranged opposite one another on both sides of the transport track (3) and are each connected to at least one actuating drive (6) so as to move in a direction of a width of a the transport track (3), the actuating drives can be actuated perpendicularly to the transport direction (7) of the rolled or cast product (2), wherein the first and the second guide rule (4, 5) are adjusted independently from each other by the respective actuating drives (6) on a basis of an actual position of the rolled or cast product (2) on the transport track (3), such that respective longitudinal axes ($4_L$, $5_L$) thereof are each be positioned, independently of the other, at a respective specified angle ($\alpha$) relative to the transport direction (7) of the rolled or cast product (2), and/or at a different distance from a transport track center ($3_M$), wherein at least an infeed-side ends (9) and an outlet-side ends (10) of the guide rules (4, 5) each have a contact roller (8), wherein the contact rollers (8) are placed in contact with and roll along a lateral edges of the rolled or cast product (2) by a displacement of the guide rules (4, 5) in the direction of the width of the transport track (3), in order to guide the rolled or cast product (2) and/or to reduce its width by compression and wherein, the contact rollers (8) are driven separately in order to exert an additional driving force on the rolled or cast product (2) in the transport direction (7) thereof.

16. The method according to claim 15, characterized in that, before the rolled or cast product (2) reaches the lateral guiding device (1) on the transport track (3), the infeed-side ends (9) of the guide rules (4, 5) are spaced farther from one another than the outlet-side ends (10) of the guide rules (4, 5), so that the longitudinal axes ($4_L$, $5_L$) of the guide rules (4, 5) are arranged in the form of a chute in the transport direction (7) of the rolled or cast product (2).

17. The method according to claim 15, characterized in that, once a leading end face of the rolled or cast product (2) has passed at least the infeed-side ends (9) of the guide rules (4, 5), the two guide rules (4, 5) are positioned parallel to one another.

18. The method according to claim 17, characterized in that the longitudinal axes ($4_L$, $5_L$) of the guide rules (4, 5) are each aligned substantially parallel to the transport direction (7) of the rolled or cast product (2), or in that the respective longitudinal axes ($4_L$, $5_L$) of the guide rules (4, 5) are each aligned at specified respective angles ($\alpha$) relative to the transport direction (7) of the rolled or cast product (2), so that the rolled or cast product (2) is placed at a specified angled position relative to the transport direction (7) thereof.

19. The method according to claim 18, characterized in that a certain engagement of the guide rules (4, 5) against the rolled or cast product (2) exerts a torque for rotation thereof on the transport track (3) and/or a transverse force for a displacement thereof relative to a transport track center ($3_M$) and/or for a compression thereof for reducing its width.

20. The method according to claim 19, characterized in that the actuating drives (6) are actuated for moving the first and/or the second guide rule (4, 5) in such a way that when contact is established between the guide rules (4, 5) and the rolled or cast product (2), a force exerted on the lateral edges thereof does not exceed a preset threshold value.

21. The method according to claim 16, characterized in that the position of the guide rules (4, 5) relative to the transport track (3) is monitored constantly, wherein on basis of these position data, a subsequent transport path of the rolled or cast product (2) relative to the width of the transport track (3) downstream of the lateral guide device (1) is determined.

22. The method according to claim 15, characterized in that, before the rolled or cast product (2) reaches the lateral guiding device (1) on the transport track (3), or shortly after the rolled or cast product (2) has passed the infeed-side ends (9) of the guide rules (4, 5), the outlet-side ends (10) of the guide rules (4, 5) are spaced farther from one another than the infeed-side ends (9) of the guide rules (4, 5), so that the longitudinal axes ($4_L$, $5_L$) of the guide rules (4, 5) are arranged in the form of a chute opposite the transport direction (7) of the rolled or cast product (2).

23. The method according to claim 22, characterized in that, once a leading end face of the rolled or cast product (2) has passed the outlet-side ends (10) of the guide rules (4, 5), the two guide rules (4, 5) are positioned parallel to one another.

24. The method according to claim 22, characterized in that as the first guide rule (4) and/or the second guide rule (5) are being positioned parallel to one another, said guide rules either come into contact with the lateral edges of the rolled or cast product (2) or are arranged at a specified distance from the lateral edges of the rolled or cast product (2).

25. The method according to claim 15, characterized in that the actuating drives (6) for moving the guide rules (4, 5) are actuated by means of a control device (20) in a path-controlled and/or force-controlled manner.

26. The method according to claim 25, characterized in that the positions of the guide rules (4, 5) are detected by means of path transducers (18) and/or an actual position of the rolled or cast product (2) relative to a transport track center ($3_M$) is detected by means of at least one sensor means (19), and these positions are transmitted to the control device (20), wherein when these positions fall below specified threshold values for these positions in relation to a lateral edge region ($3_R$) of the transport track (3), the actuating drives (6) are actuated by the control device (20) such that the guide rules (4, 5) return and/or displace the cast product (2) in the direction of the transport track center ($3_M$).

27. The method according to claim 15, characterized in that at least one measuring device (19) is provided, by means of which an actual position and/or actual form of the rolled or cast product (2) on the transport track (3) is determined, wherein the at least one measuring device (19) is designed particularly as a distance meter and is configured such that the lateral edges of the rolled or cast product (2) are detected over a length of the cast product (2) relative to a reference plane or relative to a reference point, so that the position of the rolled or cast product (2) on the transport track (3) is fully determined, and on the basis thereof, the actuating drives (6) for the guide rules (4, 5) are actuated so as to align a desired target position and/or target form of the rolled or cast product (2) relative to a width of the transport track (3).

* * * * *